Figure 1:
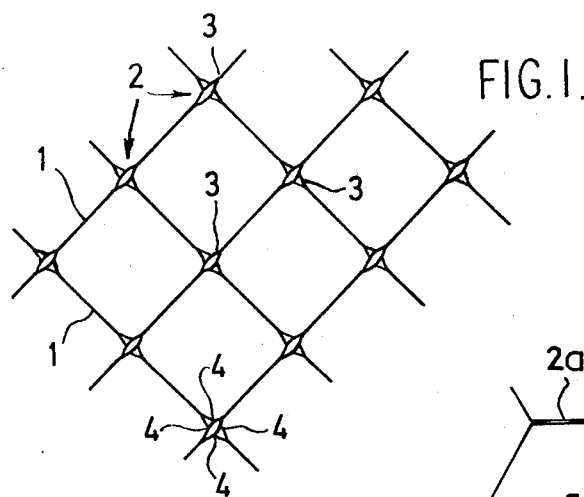

United States Patent [19]

Mercer et al.

[11] 4,020,208
[45] Apr. 26, 1977

[54] EXTRUDED PLASTIC MESH

[75] Inventors: Frank Brian Mercer; Keith Fraser Martin, both of Blackburn, England

[73] Assignee: Netlon Limited, England

[22] Filed: Sept. 3, 1975

[21] Appl. No.: 609,927

[30] Foreign Application Priority Data

Sept. 11, 1974 United Kingdom ............ 39546/74

[52] U.S. Cl. .............................. 428/255; 428/910; 428/36; 156/167; 264/167; 264/174; 264/DIG. 81

[51] Int. Cl.² ...................... B32B 5/02; D01D 5/12; D02J 1/22; B29D 23/06

[58] Field of Search ............... 264/167, 174, 176 F, 264/DIG. 81; 428/36, 255, 910; 156/167

[56] References Cited

UNITED STATES PATENTS

| | | |
|---|---|---|
| 3,384,530 | 5/1968 | Mercer et al. ................ 264/167 X |
| 3,551,543 | 12/1970 | Mercer et al. ................ 264/167 |
| 3,758,359 | 9/1973 | Azuma .......................... 264/167 X |
| 3,968,621 | 7/1976 | Poupitch ...................... 156/167 X |

*Primary Examiner*—Philip Dier
*Attorney, Agent, or Firm*—Stevens, Davis, Miller & Mosher

[57] ABSTRACT

An extruded plastic mesh of the type indicated having mesh openings each of which is a six-sided figure bounded on four sides by portions of four separate strands and on oppositely disposed two sides by elongate members comprising confluent portions of pairs of said four strands and forming a crotch at each end of each elongate member, wherein all of said strands and elongate members have preferred molecular orientation of the plastic material thereof in the direction of their major dimension and passing through and around the crotches of the elongate members of adjacent mesh openings and wherein the length of each elongate member measured from crotch to crotch is at least twice the diameter of a notional circle having the same area as the cross section of the elongate member at about its mid-point.

4 Claims, 13 Drawing Figures

EXTRUDED PLASTIC MESH

This invention relates to extruded plastic mesh of the type comprising two sets of strands lying in adjacent planes (i.e. bi-planar) each set extending obliquely to the other and the sets joined together at their crossing points by tenacious intersections or junctions. Such intersections or junctions (hereinafter referred to as "intersections") may be produced either as confluent integral (i.e. unbonded) intersections formed before or as the mesh strands are extruded or by adhesive bonding of one extruded strand to another where they cross in contact, the adhesive bond being tenacious due to there being an adequate area of contact between the strands to prevent one strand being torn or stripped from the other under stresses applied to either strand or both for the purpose of stretching and molecularly orienting the plastic material of which the mesh is composed.

It is known to be advantageous to subject extruded or cast mesh of the above type to treatment whereby the mesh strands are stretched with concomitant molecular orientation of the plastic material from which the mesh is cast. The term "molecular orientation" is used in the sense of its normal meaning is plastics technology, but refers to molecular orientation by stretching as opposed to melt flow orientation and the presence of, and degree of, molecular orientation can be ascertained by recognised methods of determination and quantification such as X-ray diffraction or optical bi-refringence. Where the term "orientation" (or a derivative) is used herein it means "molecular" orientation.

In order to stretch such mesh structures effectively, it is essential that the mesh structure as a whole can stand up to resultant physical changes in the strand and intersection structures individually so that after the whole structure has been stretched it remains an effective structure and does not experience stripping of the intersections so that the mesh, when put to use, may be liable to disintegrate locally or fall apart into a collection of disconnected strands.

Mesh structures of the type indicated suffer one economic disadvantage and that is that the intersections of such mesh structures, after stretching in known manner, contain excess quantities of unstretched and unoriented resin which do not contribute to the useful physical properties of the net, more particularly texture and strength.

It is an object of the present invention to produce an improved mesh structure of the type indicated which has an improved "handle" in that it is more limp and pliable and is more like a conventional textile product and which has improved strength, the improvement arising from redistribution of resin in the mesh intersections.

The excess and useless quantity of resin remaining in the intersections represents a very significant economic factor as will be seen from the following data produced by the Shirley Institute of Didsbury, Manchester:

| Type of Mesh Structure | % of total mesh weight contained in mesh intersection. |
|---|---|
| Fine net (5 strands/ inch) for produce packaging | 52.2 |
| Fine net (2 strands/ inch) for produce packaging | 48.8 |
| Crop protection net, ¾ inch mesh | 64.7 |

The structure of an intersection of an oriented strand mesh of the type indicated is a generally cruciform mass, the mesh strands being extensions of the arms of the cruciform mass. Thus between each adjacent pair of strands where they enter or leave the intersection mass there is a V-shaped crotch, the base of which may be sharp or rounded, but which in either case represents an incipient tear point at which the mesh structure may rupture. When an intersection is considered in its direction of extrusion, hereinafter referred to as the "machine direction" (or MD), each intersection has an upstream and a downstream crotch and transversely to the machine direction, hereinafter referred to as the "transverse direction" (or TD) each intersection has a left-hand and right-hand crotch.

In order to provide for improved uniformity of molecular orientation throughout the mesh structure and to eliminate the above structural weaknesses generated at the intersection crotches there has been proposed a method of causing molecular orientation of the resin in the mesh intersection crotches. This method is set out in U.K. Patent Specification No. 969,205 in the name of Arnaldo Monosilio published on Sept. 9, 1964 and briefly comprises submitting the net mesh to a stretching process applied simultaneously to all the net strands in each of two stages and in two directions to orientate the molecules in the intersections in two direction. In this known procedure, while molecular orientation takes place in the intersection crotches, the resin content in the intersection remains concentrated as an integral mass having no major dimension, so that while the tendency of the intersection to rupture at any of the crotches is eliminated or greatly reduced, there remains a high proportion of excess and wasted resin in the intersections which plays no useful part in the physical properties of the net.

It is a further object of the present invention to produce an improved mesh structure of the type indicated having improved handle and strength as mentioned above and in which the resin wastage heretofore inherent in the mesh intersections is reduced or in which the resin wastage is largely eliminated while at least maintaining the useful physical properties of a comparable conventional mesh.

The invention consists in an extruded plastic mesh of the type indicated wherein each mesh opening is a hexagonal figure the sides of which comprise stretched molecularly oriented members of strand form.

The invention further consists in an extruded plastic mesh of the type indicated having mesh openings each of which is a six-sided figure bounded on four sides by portions of four separate strands and on oppositely disposed two sides by elongate members comprising confluent portions of pairs of said four strands and forming a crotch at each end of each elongate member, wherein all of said strands and elongate members have preferred molecular orientation of the plastic material thereof in the direction of their major dimension and passing through and around the crotches of the elongate members of adjacent mesh openings and wherein the length of each elongate member measured from crotch to crotch is at least twice the diameter of a notional circle having the same area as the cross section of the elongate member at about its mid-point.

To produce the oriented mesh according to the present invention from the cast mesh at least two stages of stretching are required and a net may be obtained which has mesh openings of comparable size to a conventional strand oriented net but which is of reduced weight (with concomitant resin saving), by forming the "as cast" mesh, with a smaller mesh size than the as cast net of a conventional net.

The stage-by-stage stretching of the mesh structure according to the present invention causes the following sequential modification of the structure:

i. elongation and molecular orientation of the as cast strands;
ii. conversion of the as cast intersections into stretched and molecularly oriented elongate members, and
iii. stressing the crotches at the ends of each elongate member so that molecular orientation passes through and across the crotches, thus after the as cast strands have been stretched, continued stretching of the mesh structure causes the as cast mesh intersections to commence to stretch so that elongation of the intersection occur and each mesh opening gradually transforms from a four-sided diamond shape into a six-sided figure, four sides of which are constituted by the portions of four separate stretched strands and the fifth and sixth sides are constituted by the intersections which have stretched into members of elongate form and comprising oriented plastic material.

The cast mesh is conveniently extruded in tubular form from a counter-rotating concentric pair of circular dies each having a circular series of spaced extrusion die orifices as described and illustrated in U.K. Pat. No. 836,555, the cast product having confluent integral intersections with the strands being divisions of the intersections producing a diamond mesh one diagonal of which extends in the machine direction, the other diagonal transversely thereto in the traverse direction.

Figure 2:
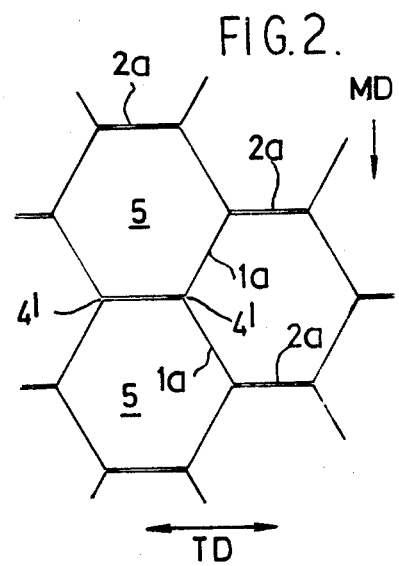
Figure 3:
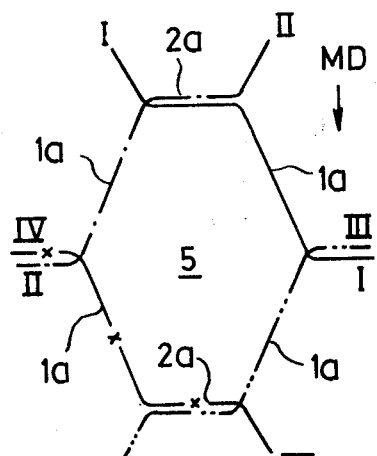
Figure 4:
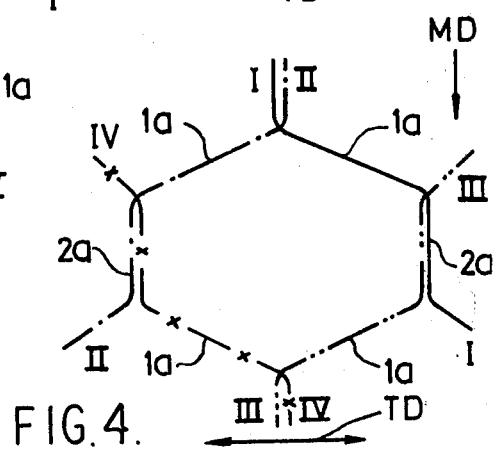
Figures 5, 6, 7:
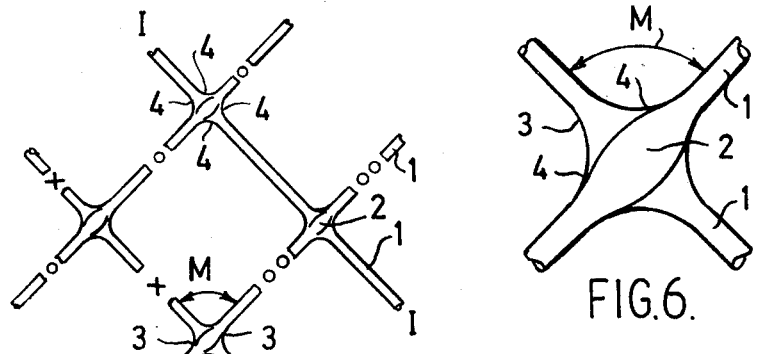
Figures 8, 10:
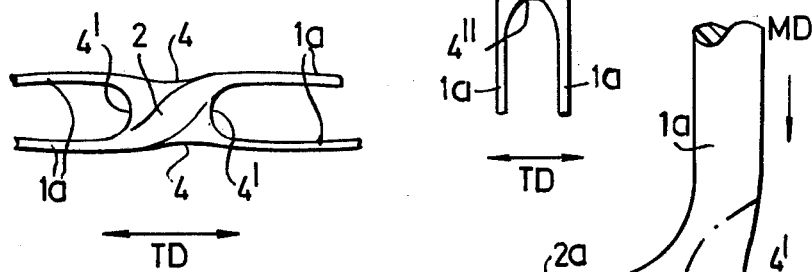
Figure 9:
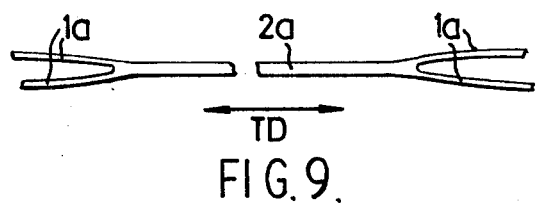
Figure 11:
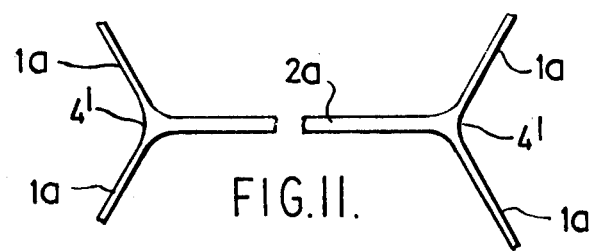
Figure 12:
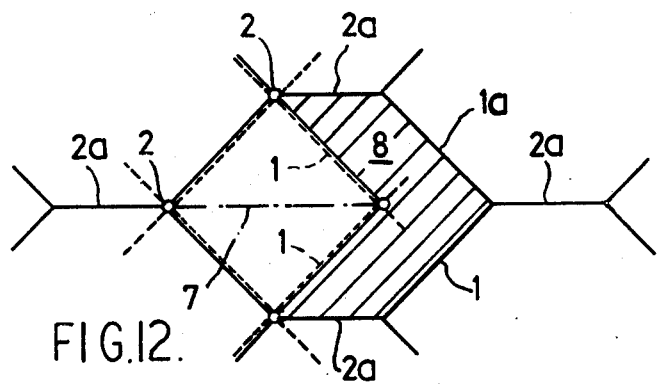
Figure 13:
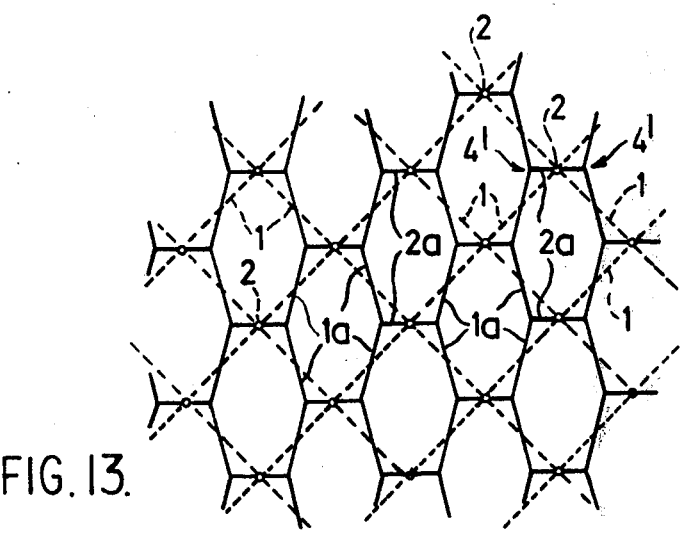

In view of the stretching, and consequent molecular orientation of the plastic material (or resin), inherent in the carrying out of the present invention, it is necessary to select suitable resins and by suitable is meant not only that they are molecularly orientatable but that they do not exhibit a tendency to split (or fibrillate) longitudinally at high orientation. Sutiable resins may be selected from the following:

polyolefins (e.g. polyethylene, polypropylene)
polyamides
polyesters In the accompanying drawings:

FIG. 1 is a representation of a conventional orientated light-weight extruded plastic mesh structure, FIG. 2 is a representation of an orientated light-weight extruded plastic mesh structure according to the present invention, FIGS. 3 and 4 are diagrams showing two forms of mesh opening structure in orientated state according to the present invention, FIG. 5 is a diagram of an extruded plastic mesh structure as cast prior to stretching according to the present invention, FIGS. 6 to 11 show a mesh intersection sequentially modified from its as cast state (FIG. 6) through subsequent stretching stages to its final form (FIG. 11) according to the present invention, FIG. 12 is a diagram showing the change of mesh opening shape from a four-sided diamond in the as cast mesh to a six-sided or hexagonal figure of greater area than the mesh of the as cast net, and FIG. 13 is a diagram showing a mesh sturcture according to the present invention superimposed over a conventional mesh structure of comparable mesh.

Referring to the drawings, there is shown in FIG. 1 a conventional light-weight extruded plastic mesh structure which has been subjected to stretching and molecular orientation of the strands 1 in known manner leaving the intersections 2 unstretched and comprising generally cruciform masses in which there is a considerable concentration of the resin weight of the net which does not contribute to the useful physical properties of the net. A net of this structure lacks handle in that a certain rigidity at the joints and harshness of texture is caused by the intersection masses and there are points of structural weakness at the transition points 3 between the oriented strands 1 and the unoriented intersections 2 and at the crotches 4 (see also FIGS. 5 and 6) which represent incipient tear points at which the net structure may rupture.

FIG. 2 shows a light-weight extruded plastic mesh structure which has been subjected to stretching and molecular orientation not only of the strands 1a but also of the intersections 2a, according to the present invention. The intersections 2a are no longer small concentrated cruciform masses like the intersections 2 of the FIG. 1 structure, but have been elongated by stretching into elongate members forming two opposite sides of each six-sided or hexagonal mesh opening 5. In the form shown in FIG. 2 (and in FIG. 3) and assuming the direction of extrusion of the product before stretching is shown by the arrow MD (the machine direction), the strand-like members (or intersections) 2a have their major dimension (length) extending in the transverse direction shown by the arrow TD. (In FIGS. 3 and 4 and FIGS. 7–11 the MD and TD arrows have the same significance as above).

Whether the elongate members (or intersections) 2a extend in the TD or in the MD (FIG. 4), each mesh opening 5 (see FIGS. 3 and 4) is a six-sided (or hexagonal) figure bounded on four sides by portions of four separate strands 1a, viz portions of strands I, II, III and IV and on two oppositely disposed sides by the elongate members (or intersections) 2a comprising confluent portions of pairs of said separate strands 1a, viz in FIG. 3 confluent portions of the strand pairs I, II and III, IV and in FIG. 4 confluent portions of the strand pairs I, III and II, IV.

As previously stated all of the strand portions 1a and each of the elongate members (or intersections) 2a are stretched and orientated, so that all sides of each six-sided (or hexagonal) mesh opening comprise stretched molecularly oriented members of strand form.

While for most normal mesh structures, the strands 1a will be subjected to maximized stretching and orientation (the intersections 2a will normally tend not to start stretching until the strands 1a approach full practical elongation under the normal conditions of stretching for plastic meshes), the degree of stretch and hence orientation can be widely varied for the intersections 2 from which the elongate members 2a are formed. The minimal stretch necessary to convert an intersection into a elongate member 2a with adequate orientation is such that the length of the elongate member 2a (measured from crotch to crotch, 4'— 4' see FIG. 2 and FIG. 10) is not less than twice the diameter of a notional circle having an area equal to the cross-section of the elongate member 2a at about its mid-point. Such a stretch will not produce substantial resin saving but will noticeably improve the handle of the product and can increase the product strength as much as 100%. In order to produce substantial resin saving while at least maintaining product strength it is necessary to increase the degree of stretch to at least 3.5 times the diameter of the notional circle referred to above and such a stretch will profoundly improve the handle of the product both as to softness and texture.

For the purpose of the present specification, the strength of the product is gauged by what is called a "loop test", the strength being termed "loop strength". Briefly, the test comprises taking a section of net cut transversely from the tubular mesh product to provide a continuous loop of net about 3 inches wide, suspending the loop, without bunching of the net, from a fixed horizontal bar, applying a load to a similar bar inserted at the lower end of the loop and increasing the load until the sample ruptures, the load at breaking point being noted as the loop strength.

The improved mesh product, according to the present invention, can be produced by several stretching procedures, which will be described below. The starting product, the as cast net as extruded, should exhibit certain features as follows:

i. There should be no (or minimal) "flooding" of plastic at the intersections to keep the initial mass of resin at the intersection to a minimum. Flooding is a known phenomenon and is caused by a transient increase in the resin flow as it passes through the die slots due to a drop in wall friction when the slots pass through register to extrude an intersection.

ii. The crotches 4 (see FIGS. 1, 5 and 6) should be radiussed and V-shaped notches avoided (this is discussed in Arnaldo Monsilio's U.K. Pat. No. 969,205 mentioned hereinbefore), and iii. the mesh angle M (see FIGS. 5 or 6) must be adjusted (by controlling in known manner the die rotation speed relative to the haul-off rate at which the net tube is pulled away from the extrusion head and choice of diameter or breadth dimensions of the mandrel over which the net tube is drawn also in known manner as it passes into the cooling bath or quench tank).

According to one preferred form of stretch treatment of the as cast net, according to the present invention, the following stepwise procedure is adopted:

1. The net tube in rope (bunched) form is stretched in known manner in the MD (see FIG. 7) to lengthen and orientate the mesh strands 1a but leaving the intersection 2 substantially unstretched as to MD crotch to MD crotch (4''— 4'') length.
2. The mesh is then stretched in the TD (see FIG. 8) to cause elongation of the intersections 2 (FIG. 8) into the stretched and orientated elongate members 2a (FIG. 9), extending in the TD.
3. The mesh is then subjected to MD tensioning in rope (bunched) form to stress the plastics material in the TD crotches 4', 4' so that orientation passes through and across the crotches 4', 4' in the MD, shown at 6 in FIG. 10.

The structure of the final product is shown in FIGS. 2 and 11.

In an alternative procedure, according to the present invention, the following sequence (not illustrated) may be applied:

1. The net tube in rope (bunched) form is stretched firstly in known manner in the MD to lengthen and orientate the mesh strands and thereafter further stretching is applied, according to the present invention, to elongate the mesh intersections into stretched and oriented elongate members extending in the TD,
2. The mesh is then tensioned in the TD so as to stress the MD crotches at each end of each elongate member.

In a still further alternative procedure, according to the present invention, the above sequence may be reversed, i.e. the first tensioning (stretching) stage is carried out in the TD to lengthen the mesh strands and to elongate the mesh intersections and then the mesh is tensioned in MD to stress the TD crotches at each end of each elongate member.

It is preferred however to start with an initial MD stretching stage of the mesh strands 1a since this substantially increases the diameter of the net tube and makes it physically easier to insert a TD stretching device into the interior of the net tube to apply the subsequent TD stretching.

Stretching the intersections 2 into elongate members 2a extending in the MD has its advantages during manufacture in that it is easier to MD stretch the net to high orientation in rope form than to do the same by TD stretching, but for most packaging uses tubular net with elongate members 2a extending in the TD is more desirable both as regards the net's end use as a package and as regards loading the tubular net as sleeves on the loading tubes of known packing and clip-sealing machines.

Various combinations of MD and TD stretching can be used according to the desired end use of the product and production problems which may be inherent in a given as cast mesh structure.

The MD stretching of a net tube to elongate the mesh strands only can be followed by slitting the net tube into a web and TD stretching the web on a known type of TD stretcher or tenter machine to elongate the as cast intersections into elongate members.

The greater the degree of stretch imparted to the mesh intersections 2 the longer will be the elongate members 2a with consequent greater resin saving, for example if the mesh intersections 2 are stretched to form elongate members 2a equal in length to half the diagonal 7 of the original mesh taken in the direction of intersection elongation then the area of each mesh opening (see FIG. 12) is increased by cross-hatched area 8, thus the total area of a mesh structure would be increased in the same proportion for the same weight of resin.

In FIG. 13 there is shown diagramatically a conventional net mesh structure (shown dotted) having strands 1 and mass intersections 2 and superimposed thereon a mesh structure (shown in full lines) according to the present invention having strands 1a and elongate members 2a (i.e. stretched and oriented intersections). While the mesh sizes of the two net mesh structures (dotted and in full lines) are comparable or of the same order, the as cast mesh from which the improved net mesh structure (shown in full lines) is formed would be of smaller and lighter mesh and strand size than that from which the conventional (dotted) mesh structure was made, thus the improved mesh structure will weigh less per unit area with resultant resin saving and will have an improved handle due to the substitution of the flexible elongate members 2a for the concentrations of resin forming the mass intersections 2 of a conventional net.

We claim:

1. An extruded plastic mesh having mesh openings each of which is a six-sided figure bounded on four sides by portions of four separate strands and on oppositely disposed two sides by elongate members comprising confluent portions of pairs of said four strands and forming a crotch at each end of each elongate member, said strands and elongate members having preferred molecular orientation of the plastic material thereof in the direction of their major dimension and passing through and around the crotches of the elongate members of adjacent mesh openings.

2. An extruded plastic mesh as claimed in claim 1 wherein the length of each elongate member is at least 3.5 times the diameter of a circle having an area equal to the cross sectional area of the elongate member at its mid-point.

3. An extruded plastic mesh as claimed in claim 7 wherein the elongate members extend in the transverse direction.

4. An extruded plastic mesh as claimed in claim 2 wherein the elongate members extend in the machine direction.

* * * * *